Patented Sept. 18, 1928.

1,684,755

UNITED STATES PATENT OFFICE.

ALBERT L. CLAPP, OF DANVERS, MASSACHUSETTS.

SYNTHETIC RESIN FIBER BOARD.

No Drawing.   Application filed December 22, 1922.  Serial No. 608,580.

The object of the present invention is to produce, by the use of paper-making machinery, a fiberboard or paper containing a maximum quantity of synthetic resins or gums,—especially fusible forms of phenol resins rendered set or infusible, as hereinafter described, under the action of heat and pressure,—and possessing marked insulating and waterproof properties.

Hitherto the attempts to incorporate synthetic resins in a fibrous stock have been unsuccessful commercially, for the reason (among others) that, when the dried sheets were subjected to heat and pressure, the discrete particles of resin would not flux readily or sufficiently to penetrate throughout the entire sheet.

I have discovered, however, that, if there be employed with such synthetic (e. g. phenol) resins, a relatively-low-melting-point fluxing agent such as a natural resin, of which rosin is an example, or a wax, of which Montan wax is a representative,—it is possible, when the sheet in which these bodies are incorporated is subjected to heat and pressure, to cause the discrete particles to flux and blend and penetrate the pores and interstices of the fibrous sheet, all without materially affecting the physical or electrical properties of the synthetic resin or the cellulose fiber.

I have further discovered that wood flour, i. e. finely pulverized wood of substantially the fineness of wheat flour, has the property of carrying into an aqueous fiberous pulp relatively large quantities of pulverized gums or resins, either natural or synthetic, and that this is augmented by the production in the pulp of a coagulum which functions to fix the pulverized gums or resins on the fibers.

As a result of these discoveries, I have found that, by incorporating in aqueous paper stock powdered phenol or other synthetic resin and a fluxing agent for the resin (such as rosin or Montan wax), then sheeting the pulp, and after drying the sheet subjecting it to sufficient heat and pressure to set or render the resin imfussible for a brief period,—there is produced a sheet loaded with synthetic resin in a coalescent practically-continuous state, possessing a high coefficient of electrical resistance, and having those other properties incident to the synthetic resin employed.

In selecting the fluxing agent, care must be exercised to use only those which are solid at ordinary temperatures and are capable of being powdered, and which have a relatively low coefficient of viscosity when molten, so that they will be capable of blending with the phenol-resin at its setting temperature and penetrating the pores and interstices and the fibers of the fibrous foundation in which they are incorporated.

The following examples will serve to illustrate my new process for producing a fiberboard or paper embodying my invention.

I charge an ordinary beating engine (such as employed for producing paper pulp to be sheeted by a paper-making machine) with say 10 to 20 parts by weight of any suitable cellulose fibers, preferably sulphate pulp because of its strength when sheeted, and just sufficient water to ensure the proper circulation of the stock. This stock is now beaten, until it is more or less hydrated, say for a period of about one and a half hours. There is now thoroughly beaten into and distributed throughout the stock 50 to 90 parts of finely divided fusible phenol resin or other equivalent synthetic resin. Then I add 10 to 15 parts of the fluxing agent in finely powdered form,—either rosin or Montan wax or their equivalent. As hereinbefore mentioned, the rosin employed for this purpose is in a natural or unsaponified condition. After these are thoroughly mixed into the aqueous pulpy mass, the stock is ready to be sheeted on a paper machine.

Preferably, in the preparation of the pulp, I incorporate therein, either before or after the addition of the synthetic resin, a certain quantity of wood flour, say, 15 to 30 parts; and, if a coagulum is to be produce in the pulp I beat into the pulp before the synthetic resin is added, say, 10 parts of sodium silicate in an aqueous solution, 40°–60° Bé.; and, as a final step in the process, mix into the pulp about 20 parts of alum or equivalent coagulant.

The stock is then sheeted by any suitable form of paper-making machine, such for example as a wet or a multiple-cylinder machine. Preferably the sheets are air dried, or, if not, a sufficiently low drying temperature should be employed as will not affect the phenol resin. Finally the dry sheets are subjected to the application of heat and great pressure for a brief period to cause the setting of the resin to an infusible condition. For example, they are subjected to a pressure of about 1,000 pounds per square inch, more or less, and to a temperature of, say, 300° F. for about 15 seconds. When so treated, the resultant product is a hard dense sheet having the resinous material thoroughly incorporated therein and coalesced and set or rendered infusible throughout the sheet, so that the fibers are encased and more or less penetrated by the infusible resinous material.

I have found that two sheets, when initially dried, placed in facial contact, and subjected to heat and pressure, as hereinbefore described, become cemented together and form a substantially integral and homogenous sheet.

It will be observed that the amount by weight of resin in the sheet greatly exceeds that of the fibers,—being in fact several times that of the fibers and at least five times that of the fluxing agent. When wood flour is used as a carrier, the ratio thereof to the phenol resin and the fluxing agent may be 1 to 4 or approximately 1 to 5.

Whereas it is desirable to utilize a relatively small quantity of fluxing agent, yet it is not always essential if wood flour be employed for carrying the synthetic resin in the formation on the cylinder mold. Thus, in some instances, I may omit the fluxing agent and utilize only the wood flour and a coagulum such as aluminum silicate. It is evident that, in lieu of coagulating aluminum silicate, I may precipitate in the fibrous stock aluminum resinate by incorporating sodium resinate in the pulp and precipitating with alum as aluminum resinate (in contradistinction to the natural rosin used as a flux). The resinate, in either event, acts as a coagulum, which together with the wood flour gives excellent results in retaining the synthetic resin and ensuring its distribution throughout the stock and the web formed therefrom.

What I claim is:—

1. A process of producing fiberboard, which comprises incorporating into an aqueous cellulosic pulp, wood flour and pulverized synthetic resin, sheeting the pulp, and subjecting the sheet to heat and pressure.

2. A process of producing fiberboard, which comprises incorporating into an aqueous cellulosic pulp, pulverized phenol fusible resin capable of being rendered infusible by heat and pressure and a pulverized fluxing agent for said resin, sheeting the pulp, and subjecting the pulp to heat and pressure sufficient to flux the resin and the agent and render the resin infusible.

3. A process of producing fiberboard, which comprises incorporating into an aqueous cellulosic pulp, pulverized phenol fusible resin capable of being rendered infusible by heat and pressure, a pulverized fluxing agent for said resin and a coagulum, sheeting the pulp, and subjecting the pulp to heat and pressure sufficient to flux the resin and the agent and render the resin infusible.

4. A process of producing fiberboard, which comprises incorporating into an aqueous cellulosic pulp, pulverized phenol resin, a pulverized fluxing agent, wood flour and a coagulum, sheeting the pulp, and subjecting the pulp to heat and pressure sufficient to flux the resin and the agent and set the resin.

5. A process of producing fiberboard which comprises forming an aqueous pulp of cellulose fibers, beating therein powdered phenol resin and sodium silicate, adding an agent for precipitating the silicate, and sheeting the pulp on a paper-making machine.

6. A process of producing fiberboard which comprises forming an aqueous pulp of cellulose fibers, beating therein powdered fusible phenol resin capable of being rendered infusible by heat and pressure and a powdered fluxing agent for said resin, sheeting the pulp on a paper-making machine, and then subjecting the resultant sheet to sufficient heat and pressure to render the resin infusible.

7. A process of producing fiberboard which comprises forming an aqueous pulp of cellulose fibers, beating therein powdered phenol resin and a powdered fluxing agent together with wood flour, forming a gelatinous precipitate in the pulp by the precipitation of sodium silicate with alum, sheeting said pulp on a paper-making machine, and subjecting the sheet to heat and pressure sufficient to flux the phenol resin and the fluxing agent and to cause the phenol resin to set.

8. A rigid dense fiberboard comprising cellulose fibers, synthetic resin, a fluxing agent and wood flour, the amount of resin being several times that of the fibers.

9. A rigid dense fiberboard comprising cellulose fibers, infusible synthetic resin, a fluxing agent for said resin and a coagulum, said resin and fluxing agent being coalesced throughout the sheet and encasing the fibers thereof.

10. A rigid dense fiberboard comprising cellulose fibers, synthetic resin, a fluxing agent blending with the synthetic resin, wood flour and a coagulum, the synthetic resin and the fluxing agent being coalescent throughout the sheet and encasing the other components thereof.

In testimony whereof I have affixed my signature.

ALBERT L. CLAPP.